(12) United States Patent
Hapsari et al.

(10) Patent No.: US 8,903,410 B2
(45) Date of Patent: Dec. 2, 2014

(54) MOBILE COMMUNICATION METHOD AND RADIO BASE STATION

(75) Inventors: Wuri Andarmawanti Hapsari, Tokyo (JP); Hideaki Takahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/993,597

(22) PCT Filed: Dec. 7, 2011

(86) PCT No.: PCT/JP2011/078303
§ 371 (c)(1),
(2), (4) Date: Jun. 12, 2013

(87) PCT Pub. No.: WO2012/081468
PCT Pub. Date: Jun. 21, 2012

(65) Prior Publication Data
US 2013/0267238 A1    Oct. 10, 2013

(30) Foreign Application Priority Data

Dec. 13, 2010    (JP) .................................. 2010-277354

(51) Int. Cl.
*H04W 72/00*    (2009.01)
*H04W 24/10*    (2009.01)

(52) U.S. Cl.
CPC ..................................... *H04W 24/10* (2013.01)
USPC ........... 455/450; 455/434; 455/424; 455/466; 455/418; 455/67.11

(58) Field of Classification Search
None
See application file for complete search history.

(56) References Cited

U.S. PATENT DOCUMENTS

2009/0312001 A1\* 12/2009 Bodog ........................... 455/418
2011/0201279 A1\*  8/2011 Suzuki et al. .............. 455/67.11

FOREIGN PATENT DOCUMENTS

| CN | 101420711 A | 4/2009 |
| WO | 2010/090179 A1 | 8/2010 |

OTHER PUBLICATIONS

International Search Report issued in PCT/JP2011/078303 mailed Jan. 24, 2012 (2 pages).
Japanese Office Action issued in Japanese Application No. 2010-277354 mailed Apr. 17, 2012 (4 pages).
3GPP TS 37.320 V2.0.0; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Nov. 2010 (18 pages).
Korean Notice of Preliminary Rejection issued in Korean Application No. 10-2013-7015875 mailed Sep. 9, 2013, and translation thereof (7 pages).

(Continued)

*Primary Examiner* — Sharad Rampuria
*Assistant Examiner* — Sayed T Zewari
(74) *Attorney, Agent, or Firm* — Osha Liang LLP

(57) ABSTRACT

A mobile communication method according to the present invention includes: a step of transmitting, by an operation and maintenance server EM, "MDT config" to a radio base station eNB; a step of selecting, by the radio base station eNB, a target mobile station UE on the basis of the "MDT config"; a step of inquiring, by the radio base station eNB, of a mobility management node MME or a subscriber management server HSS about whether the target mobile station UE is approved for performing an MDT measurement process; and a step of instructing, by the radio base station eNB, the target mobile station UE to perform the MDT measurement process when the target mobile station UE is approved for performing the MDT measurement process.

6 Claims, 5 Drawing Sheets

(56) References Cited

OTHER PUBLICATIONS

NTT DOCOMO, Inc., "On UE selection and MDT policy configuration," 3GPP TSG RAN2 #69bis; R2-102439; Beijing, China; Apr. 12-16, 2010 (5 pages).
Office Action issued in Chinese Application No. 201180059928.1 mailed on Dec. 23, 2013 (10 pages).
Espacenet Abstract, Publication No. CN101420711 dated Apr. 29, 2009 (1 page).
Office Action issued in Korean Application No. 10-2013-7015875 mailed on Jan. 15, 2014 (7pages).
3GPP TS 37.320 V1.0.0; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Aug. 2010 (14 pages).
Office Action issued in counterpart Korean Patent Application No. 10-2013-7015875 dated May 1, 2014 (5 pages).
Office Action issued in counterpart Chinese Patent Application No. 201180059928.1 dated Jun. 3, 2014 (9 pages).
Extended European Search Report in counterpart European Application No. 11849138.0 issued on Apr. 2, 2014 (12 pages).
3GPP S5-102235; "UE measurement collection fo eNB"; Aug. 2010 (9 pages).
3GPP S5-101402; "[DRAFT] Reply to LS on UE selection for MDT"; May 2010 (4 pages).
ETSI TS 136 300 V9.5.0; "LTE; Evolved Universal Terrestrial Radio Access (E-UTRA) and Evolved Universal Terrestrial Radio Access Network (E-UTRAN); Overall description; Stage 2"; 3GPP TS 36.300 V9.5.0; Oct. 2010 (13 pages).
Office Action issued in counterpart Korean Patent Application No. 10-2013-7015875 dated Aug. 6, 2014 (5 pages).

* cited by examiner

MOBILE COMMUNICATION METHOD AND RADIO BASE STATION

TECHNICAL FIELD

The present invention relates to a mobile communication method and a radio base station.

BACKGROUND ART

In an LTE (Long Term Evolution) scheme, "MDT (Minimisation of Drive Tests)" is defined.

The MDT includes two modes of "Immediate MDT" and "Logged MDT".

In the "Immediate MDT", a target mobile station UE is configured to perform a measurement process based on "RRC Measurement Configuration" for current RRM (Radio Resource Management), to add "Location Information" indicating location information of the target mobile station UE to "RRC Measurement Report" including a result of the measurement process, and to report the "RRC Measurement Report" to a network.

Meanwhile, in the "Logged MDT", the target mobile station UE is configured to receive "Logged MDT Configuration" in a connected state (RRCC_CONNECTED), to perform a measurement process based on the "Logged MDT Configuration" in an idle state (RRC_IDLE), to store a result of the measurement process as an MDT log, and to report the MDT log when the target mobile station UE is transitioned to the connected state (RRCC_CONNECTED).

As a procedure for starting the MDT, "Management based MDT activation procedure" is defined.

The "Management based MDT activation procedure" is configured to be able to designate a target MDT area.

CITATION LIST

Non Patent Literature

[NPL 1] 3GPP 37.320, Universal Terrestrial Radio Access (UTRA) and Evolved Universal Terrestrial Radio Access (E-UTRA); Radio measurement collection for Minimization of Drive Tests (MDT); Overall description; Stage 2

However, since the MDT is not a service for a particular subscriber of a mobile station UE, in order to allow the mobile station UE to perform an MDT measurement process, it is considered to be necessary to obtain approval of the subscriber of the mobile station UE.

Furthermore, currently, an operation and maintenance server EM or a radio base station eNB does not understand whether the target mobile station UE is approved for performing the MDT measurement process.

SUMMARY OF THE INVENTION

Therefore, the present invention has been achieved in view of the above-described problems, and an object thereof is to provide a mobile communication method and a radio base station with which it is possible to start MDT only when the target mobile station UE is approved for performing an MDT measurement process.

A first characteristic of the present invention is summarized in that a mobile communication method, in which a target mobile station performs a measurement process designated by an operation and maintenance server and reports a result of the measurement process, includes: a step of transmitting, by the operation and maintenance server, instruction information for instructing execution of the measurement process to a radio base station; a step of selecting, by the radio base station, the target mobile station on the basis of the instruction information; a step of inquiring, by the radio base station, of a predetermined node about whether the target mobile station is approved for performing the measurement process; and a step of instructing, by the radio base station, the target mobile station to perform the measurement process when the target mobile station is approved for performing the measurement process.

A second characteristic of the present invention is summarized in that a mobile communication method, in which a target mobile station performs a measurement process designated by an operation and maintenance server and reports a result of the measurement process, includes: a step of transmitting, by the operation and maintenance server, instruction information for instructing execution of the measurement process to a radio base station; a step of selecting, by the radio base station, the target mobile station on the basis of the instruction information; a step of determining, by the radio base station, whether the target mobile station is approved for performing the measurement process; and a step of instructing, by the radio base station, the target mobile station to perform the measurement process when it is determined that the target mobile station is approved for performing the measurement process.

A third characteristic of the present invention is summarized in that a radio base station, which is used in a mobile communication system configured such that a target mobile station is able to perform a measurement process designated by an operation and maintenance server and to report a result of the measurement process, includes: a selection unit that selects the target mobile station on the basis of instruction information for instructing execution of the measurement process when the instruction information is received from the operation and maintenance server; an inquiry unit that inquires of a predetermined node about whether the target mobile station is approved for performing the measurement process; and an instruction unit that instructs the target mobile station to perform the measurement process when the target mobile station is approved for performing the measurement process.

A fourth characteristic of the present invention is summarized in that a radio base station, which is used in a mobile communication system configured such that a target mobile station is able to perform a measurement process designated by an operation and maintenance server and to report a result of the measurement process, includes: a selection unit that selects the target mobile station on the basis of instruction information for instructing execution of the measurement process when the instruction information is received from the operation and maintenance server; a determination unit that determines whether the target mobile station is approved for performing the measurement process; and an instruction unit that instructs the target mobile station to perform the measurement process when it is determined that the target mobile station is approved for performing the measurement process.

As described above, according to the present invention, it is possible to provide a mobile communication method and a radio base station with which it is possible to start MDT only when the target mobile station UE is approved for performing an MDT measurement process.

DESCRIPTION OF EMBODIMENTS

Mobile Communication System According to First Embodiment of the Present Invention With reference to FIG. 1 through FIG. 4, a mobile communication system according to a first embodiment of the present invention will be described.

Figure 1:
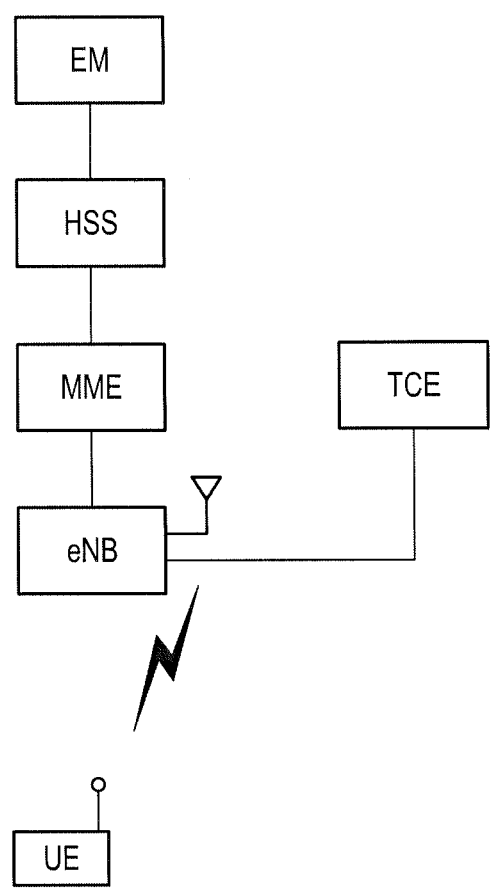
FIG. 1 is a diagram illustrating the entire configuration of a mobile communication system according to a first embodiment of the present invention.

As illustrated in FIG. 1, the mobile communication system according to the present embodiment is an LTE mobile communication system, and includes an operation and maintenance server EM, a subscriber management server HSS (Home Subscriber Server), a mobility management node MME (Mobility Management Entity), a trace collection server TCE (Trace Collection Entity), and a radio base station eNB.

In the mobile communication system according to the present embodiment, a target mobile station UE designated by the operation and maintenance server EM is configured to perform an MDT measurement process designated by the operation and maintenance server EM, and to report an MDT log including a result of the MDT measurement process.

The target mobile station UE according to the present embodiment is able to cope with "Immediate MDT" and "Logged MDT".

Furthermore, in the mobile communication system according to the present embodiment, as a procedure for starting MDT, "Management based MDT activation procedure" is applied.

Figure 2:
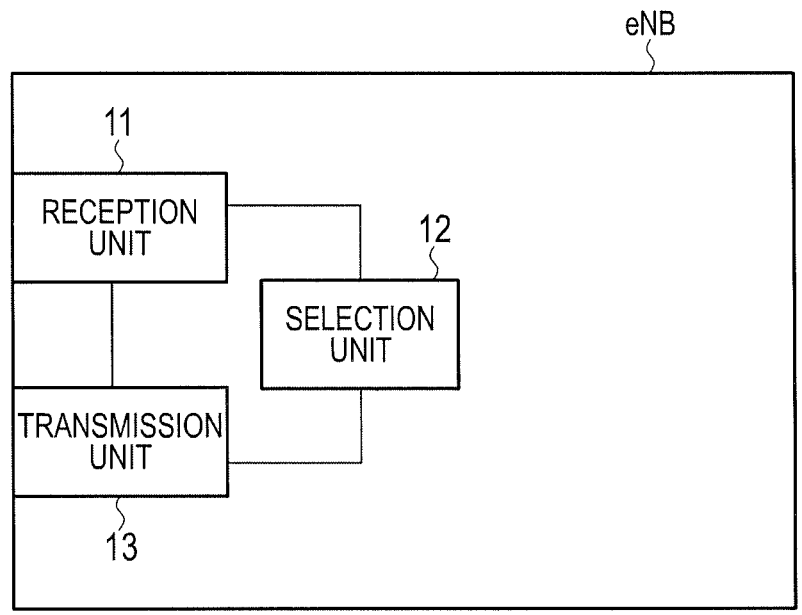
FIG. 2 is a functional block diagram of a radio base station according to the first embodiment of the present invention.

As illustrated in FIG. 2, the radio base station eNB includes a reception unit 11, a selection unit 12, and a transmission unit 13.

The reception unit 11 is configured to receive "Trace Session Activation" including "MDT config" from the operation and maintenance server EM as instruction information instructing the target mobile station UE to perform the MDT measurement process.

In the "MDT config", a target MDT area is designated and the target mobile station UE is not designated.

The selection unit 12 is configured to select the target mobile station UE when "Trace Session Activation" including the "MDT config" is received by the reception unit 11.

Specifically, the selection unit 12 may be configured to select the target mobile station UE on the basis of "UE Capability" and the like acquired from a mobile station UE in a connected state (RRC_CONNECTED) in an MDT area designated by the "MDT config".

For example, the selection unit 12 may be configured to select, as the target mobile station UE, a predetermined number of mobile stations UE capable of performing the MDT measurement process among mobile stations UE in the connected state (RRC_CONNECTED) in the MDT area designated by the "MDT config".

The transmission unit 13 is configured to transmit "Cell Traffic Trace", which includes an approval check request for inquiring whether the target mobile station UE is approved for performing the MDT measurement process, to the mobility management node MME or the subscriber management server HSS.

Furthermore, the reception unit 11 is configured to receive "Cell Traffic Trace Response", which includes an approval check result indicating an inquiry result about whether the target mobile station UE is approved for performing the MDT measurement process, from the mobility management node MME or the subscriber management server HSS.

Furthermore, when the target mobile station UE is approved for performing the MDT measurement process, the transmission unit 13 is configured to transmit "MDT config" for instructing the target mobile station UE to perform the MDT measurement process.

Meanwhile, when the target mobile station UE is not approved for performing the MDT measurement process, the transmission unit 13 is configured not to transmit the "MDT config" for instructing the target mobile station UE to perform the MDT measurement process.

Figure 3:
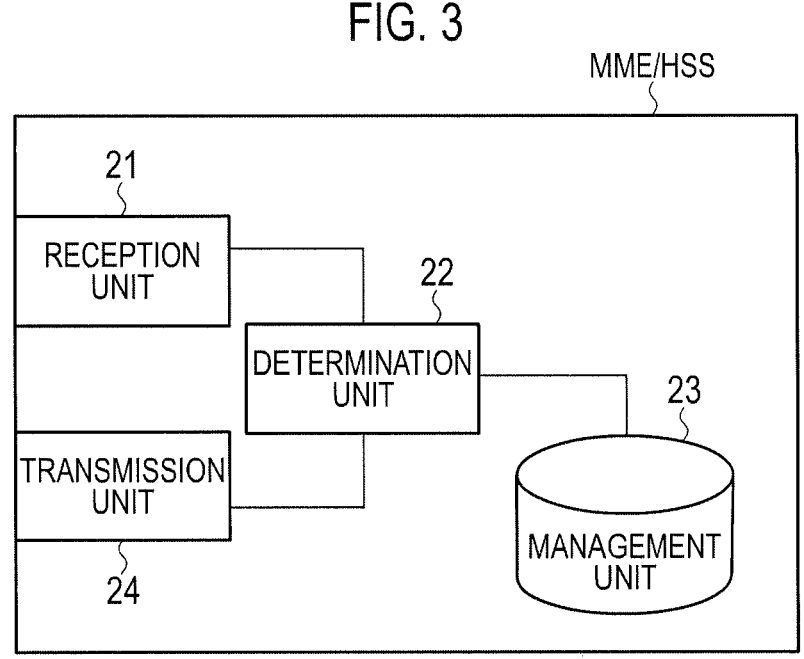
FIG. 3 is a functional block diagram of a mobility management node and a subscriber management server according to the first embodiment of the present invention.

As illustrated in FIG. 3, the mobility management node MME or the subscriber management server HSS includes a reception unit 21, a determination unit 22, a management unit 23, and a transmission unit 24.

The reception unit 21 is configured to receive "Cell Traffic Trace" including the above-described approval check request, from the radio base station eNB.

The management unit 23 is configured to manage subscriber information of each mobile station UE. For example, the management unit 23 is configured to manage approval information indicating whether each mobile station UE is approved for performing the MDT measurement process.

For example, the approval information may be set when a user of each mobile station UE applies a subscription contract.

When the "Cell Traffic Trace" including the above-described approval check request is received by the reception unit 21, the determination unit 22 is configured to determine whether the target mobile station UE is approved for performing the MDT measurement process, with reference to the management unit 23.

The transmission unit 24 is configured to transmit, to the radio base station eNB, "Cell Traffic Trace Response" including an approval check result indicating a result of the determination by the determination unit 22.

Hereinafter, with reference to FIG. 4, an example of the operations of the mobile communication system according to the present embodiment will be described.

Figure 4:
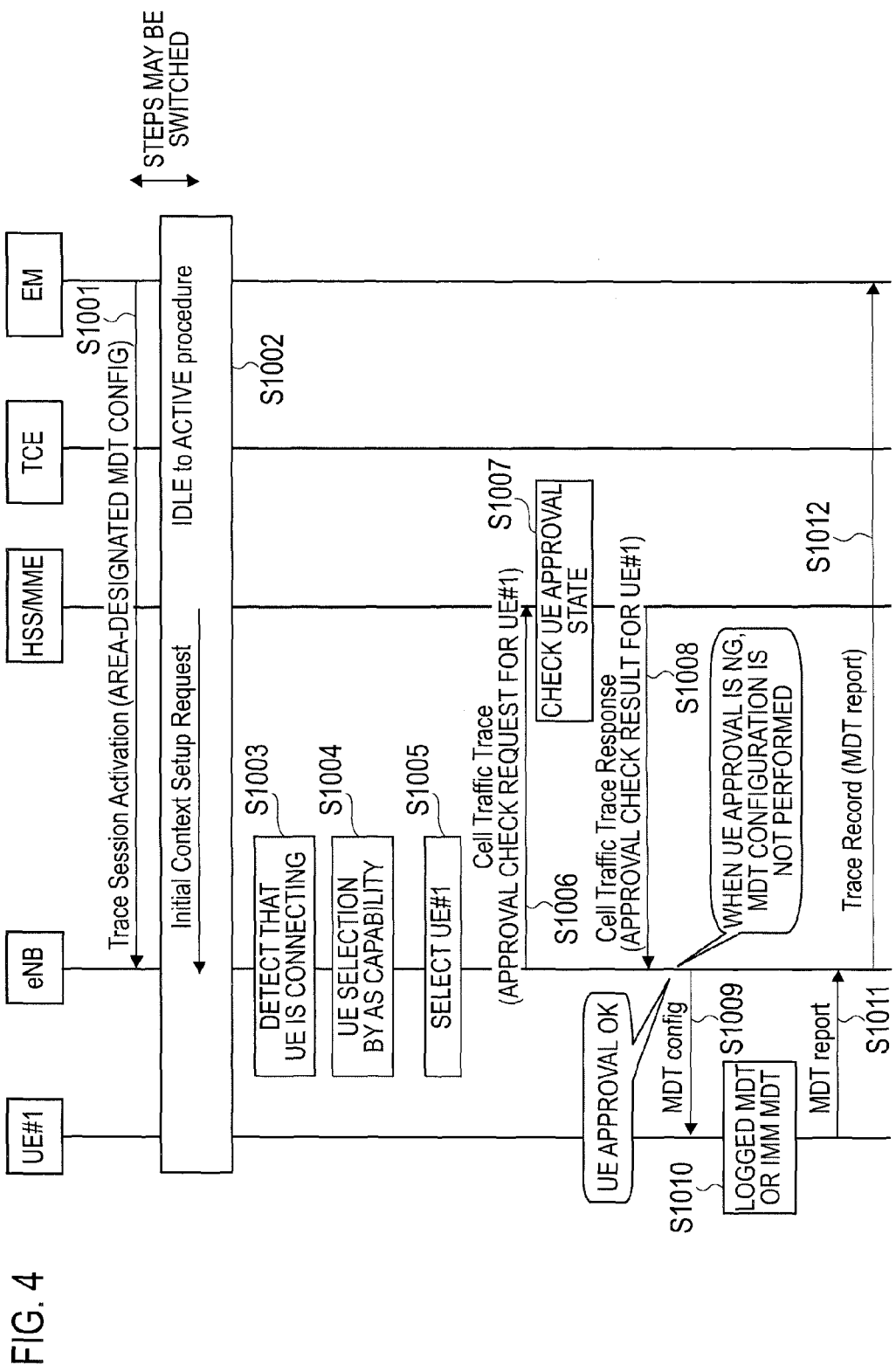
FIG. 4 is a sequence diagram illustrating operations in the mobile communication system according to the first embodiment of the present invention.

As illustrated in FIG. 4, in step S1001, the operation and maintenance server EM transmits "Trace Session Activation" including "MDT config" designating a target MDT area, to the radio base station eNB.

In step S1002, a procedure for transitioning a mobile station UE#1 from an idle state (RRC_IDLE) to a connected state (RRC_CONNECTED) is performed. Furthermore, the mobility management node MME transmits "Initial Context Setup Request" to the radio base station eNB.

In addition, in FIG. 4, the order of step S1001 and step S1002 may be switched.

The radio base station eNB extracts mobile stations UE in a connected state in the target MDT area in step S1003, acquires "UE Capability" of these mobile stations UE in step S1004, and selects the mobile station UE#1 from the mobile stations UE as the target mobile station UE in step S1005.

In step S1006, the radio base station eNB transmits "Cell Traffic Trace", which includes an approval check request for inquiring whether the mobile station UE#1 is approved for performing an MDT measurement process, to the mobility management node MME or the subscriber management server HSS.

In step S1007, in response to the "Cell Traffic Trace" including the approval check request related to the mobile station UE#1, the mobility management node MME or the subscriber management server HSS determines whether the mobile station UE#1 is approved for performing an MDT measurement process.

In step S1008, the mobility management node MME or the subscriber management server HSS transmits "Cell Traffic Trace Response" including an approval check result indicating the determination result regarding whether the mobile station UE#1 is approved for performing an MDT measurement process.

When the approval of the MDT measurement process by the mobile station UE#1 is notified by the "Cell Traffic Trace Response", the radio base station eNB notifies the mobile station UE#1 of "MDT config" by an RRC message in step S1009.

Meanwhile, when the non-approval of the MDT measurement process by the mobile station UE#1 is notified by the "Cell Traffic Trace Response", the radio base station eNB does not notify the mobile station UE#1 of the "MDT config" by the RRC message in step S1009.

The mobile station UE#1 performs the MDT measurement process in any one mode of the "Immediate MDT" and the "Logged MDT" in step S1010, and transmits an "MDT report" including a result of the MDT measurement process to the radio base station eNB in step S1011. Furthermore, the mobile station UE#1 transmits "Location Information" together with the "MDT report".

In step S1012, the radio base station eNB transmits "Trace Record", which includes the information received from the mobile station UE#1 in step S1011 and the "MDT config", to the trace collection server TCE.

In accordance with the mobile communication system according to the first embodiment of the present invention, even when the "Management based MDT activation procedure" is applied, the mobility management node MME or the subscriber management server HSS is able to start the MDT by the target mobile station UE only when it is determined that the target mobile station UE is approved for performing the MDT measurement process.

(First Modification)

Hereinafter, with reference to FIG. 5 and FIG. 6, a mobile communication system according to a first modification of the present invention is explained while focusing on the difference from the mobile communication system according to the first embodiment.

Figure 5:
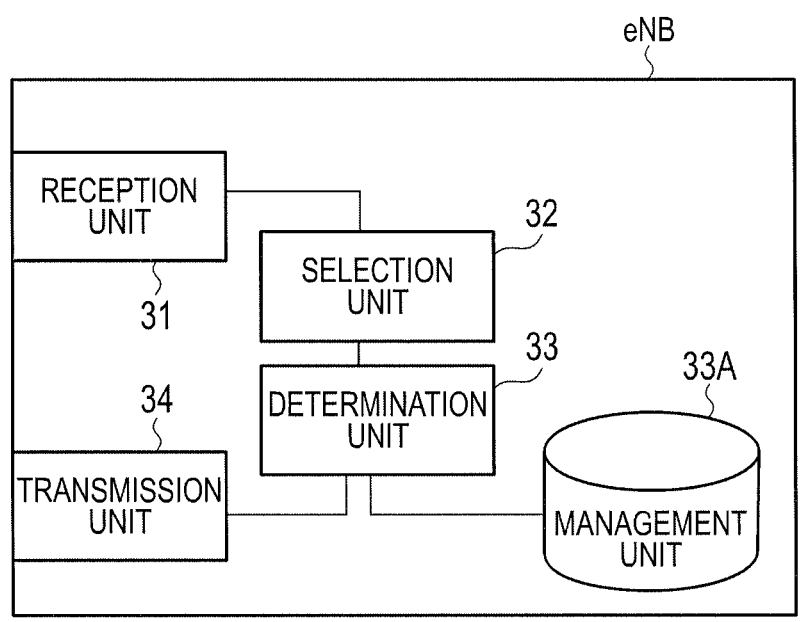
FIG. 5 is a functional block diagram of a radio base station according to a first modification of the present invention.

As illustrated in FIG. 5, the radio base station eNB includes a reception unit 31, a selection unit 32, a determination unit 33, a management unit 33A, and a transmission unit 34.

The management unit 33A is configured to manage information required for determining whether each mobile station UE is approved for performing an MDT measurement process.

For example, the management unit 33A may be configured to manage, as such information, type information such as SPID (Subscriber Profile Identity) of a mobile station UE that is approved to perform the MDT measurement process, or may be configured to manage another information element (IE: Information Element).

When "MDT Config" is received by the reception unit 31, the determination unit 33 is configured to determine whether a target mobile station UE selected by the selection unit 32 is approved for performing the MDT measurement process, with reference to the management unit 33A.

When the determination unit 33 determines that the target mobile station UE is approved for performing the MDT measurement process, the transmission unit 34 is configured to transmit "MDT Config" for instructing the execution of the MDT measurement process to the target mobile station UE.

Meanwhile, when the determination unit 33 determines that the target mobile station UE is not approved for performing the MDT measurement process, the transmission unit 34 is configured not to transmit the "MDT Config" for instructing the execution of the MDT measurement process to the target mobile station UE.

Hereinafter, with reference to FIG. 6, an example of the operations of the mobile communication system according to the first modification will be described.

Figure 6:
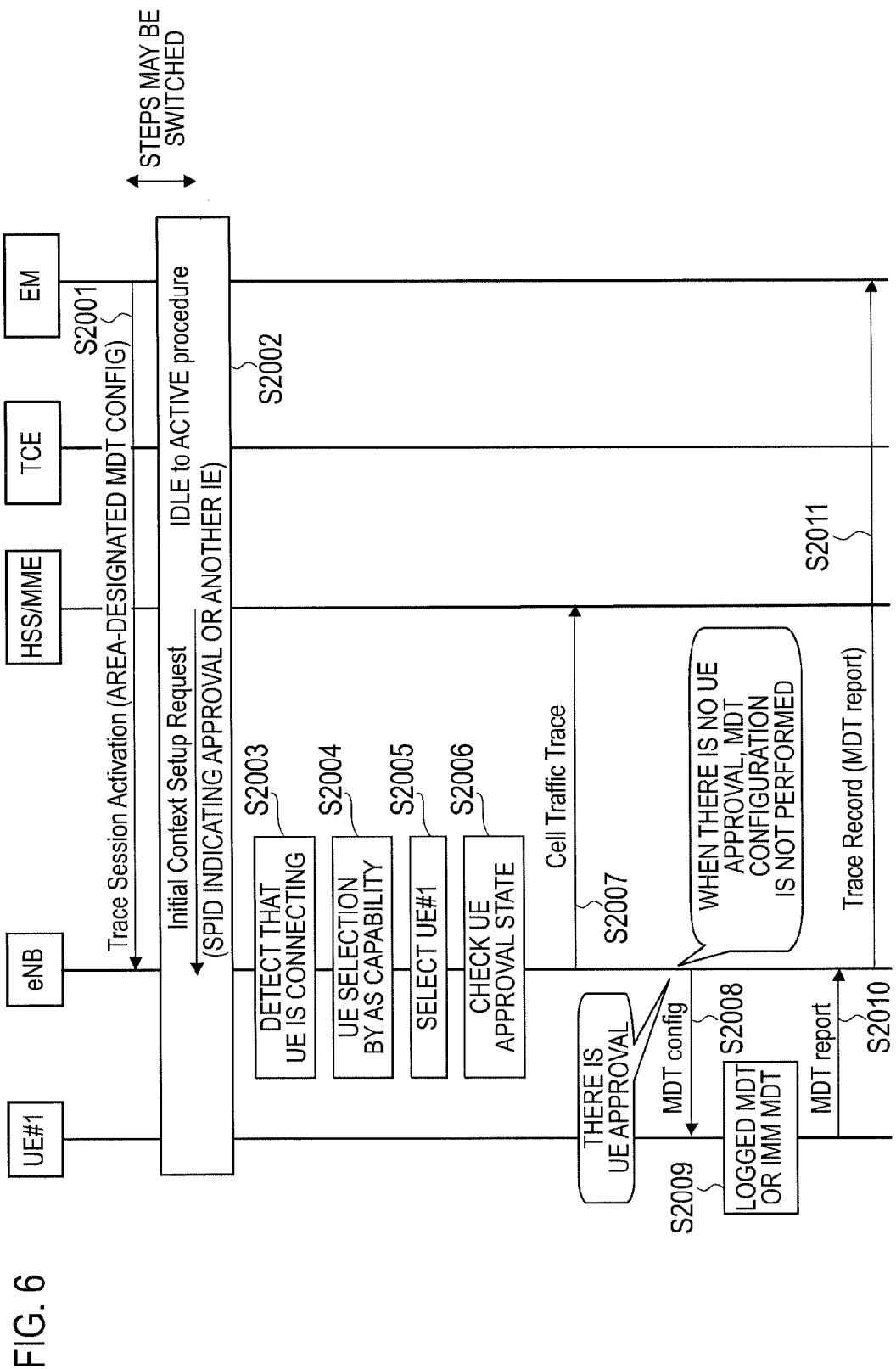
FIG. 6 is a sequence diagram illustrating operations of a mobile communication system according to the first modification of the present invention.

As illustrated in FIG. 6, in step S2001, the operation and maintenance server EM transmits "Trace Session Activation" including "MDT config" designating a target MDT area, to the radio base station eNB.

In step S2002, a procedure for transitioning the mobile station UE#1 from an idle state (RRC_IDLE) to a connected state (RRC_CONNECTED) is performed.

Furthermore, the mobility management node MME transmits, to the radio base station eNB, "Initial Context Setup Request" including type information such as SPID of a mobile station UE that is approved to perform an MDT measurement process.

In addition, in FIG. 6, the order of step S2001 and step S2002 may be changed.

The radio base station eNB extracts mobile stations UE in a connected state in the target MDT area in step S2003, acquires "UE Capability" of these mobile stations UE in step S2004, and selects the mobile station UE#1 from the mobile stations UE as the target mobile station UE in step S2005.

The radio base station eNB determines whether the mobile station UE#1 is approved for performing the MDT measurement process, with reference to type information, such as SPID (Subscriber Profile Identity) of a mobile station UE included in the "Initial Context Setup Request", and the management unit 33A in step S2006, and transmits "Cell Traffic Trace" to the mobility management node MME or the subscriber management server HSS in step S2007.

When it is determined that the mobile station UE#1 is approved for performing the MDT measurement process, the radio base station eNB notifies the mobile station UE#1 of the "MDT config" by an RRC message in step S2008.

Meanwhile, when it is determined that the mobile station UE#1 is not approved for performing the MDT measurement process, the radio base station eNB does not notify the mobile station UE#1 of the "MDT config" by the RRC message in step S2008.

The mobile station UE#1 performs the MDT measurement process in any one mode of the "Immediate MDT" and the "Logged MDT" in step S2009, and transmits an "MDT report" including a result of the MDT measurement process to the radio base station eNB in step S2010. Furthermore, the mobile station UE#1 transmits "Location Information" together with the "MDT report".

In step S2011, the radio base station eNB transmits "Trace Record", which includes the information received from the mobile station UE#1 in step S2010 and the "MDT config", to the trace collection server TCE.

In accordance with the mobile communication system according to the first modification, even when the "Management based MDT activation procedure" is applied, the radio base station eNB is able to start MDT by the target mobile station UE only when it is determined that the target mobile station UE is approved for performing the MDT measurement process.

The characteristics of the present embodiment as described above may be expressed as follows.

A first characteristic of the present embodiment is summarized in that a mobile communication method, in which a target mobile station UE performs an MDT measurement process designated by an operation and maintenance server EM and reports a result of the MDT measurement process, includes: a step of transmitting, by the operation and maintenance server EM, "MDT config (instruction information for instructing the execution of the MDT measurement process)" to a radio base station eNB; a step of selecting, by the radio base station eNB, the target mobile station UE on the basis of the "MDT config"; a step of inquiring, by the radio base station eNB, of a mobility management node MME or a subscriber management server HSS (a predetermined server) about whether the target mobile station UE is approved for performing the MDT measurement process; and a step of instructing, by the radio base station eNB, the target mobile station UE to perform the MDT measurement process when the target mobile station UE is approved for performing the MDT measurement process.

A second characteristic of the present embodiment is summarized in that a mobile communication method, in which a target mobile station UE performs an MDT measurement process designated by an operation and maintenance server EM and reports a result of the MDT measurement process, includes: a step A of transmitting, by the operation and maintenance server EM, "MDT config" to a radio base station eNB; a step B of selecting, by the radio base station eNB, the target mobile station UE on the basis of the "MDT config"; a step C of determining, by the radio base station eNB, whether the target mobile station UE is approved for performing the MDT measurement process; and a step D of instructing, by the radio base station eNB, the target mobile station UE to perform the MDT measurement process when it is determined that the target mobile station UE is approved for performing the MDT measurement process.

In the second characteristic of the present embodiment, in the step C, the radio base station eNB may be determined whether the target mobile station UE is approved for performing the MDT measurement process, on the basis of information (for example, SPID of the target mobile station UE or another information element) received from a mobility management node MME or a subscriber management node HSS (a predetermined node).

A third characteristic of the present embodiment is summarized in that a radio base station eNB, which is used in a mobile communication system configured such that a target mobile station UE is able to perform an MDT measurement process designated by an operation and maintenance server EM and to report a result of the MDT measurement process, includes: a selection unit 12 that selects the target mobile station UE on the basis of "MDT config" when the "MDT config" is received from the operation and maintenance server EM; a transmission unit 13 and a reception unit 11 that inquires of a mobility management node MME or a subscriber management server HSS about whether the target mobile station UE is approved for performing the MDT measurement process; and the transmission unit 13 that instructs the target mobile station UE to perform the MDT measurement process when the target mobile station UE is approved for performing the MDT measurement process.

A fourth characteristic of the present embodiment is summarized in that a radio base station eNB, which is used in a mobile communication system configured such that a target mobile station UE is able to perform an MDT measurement process designated by an operation and maintenance server EM and to report a result of the MDT measurement process, includes: a selection unit 22 that selects the target mobile station UE on the basis of "MDT config" when the "MDT config" is received from the operation and maintenance server EM; a determination unit 33 that determines whether the target mobile station UE is approved for performing the MDT measurement process; and a transmission unit 34 that instructs the target mobile station UE to perform the MDT measurement process when it is determined that the target mobile station UE is approved for performing the MDT measurement process.

In the fourth characteristic of the present embodiment, the determination unit 33 may be configured to determine whether the target mobile station UE is approved for performing the MDT measurement process, on the basis of information (for example, SPID of the target mobile station UE or another information element) received from a mobility management node MME or a subscriber management server HSS (a predetermined server).

In addition, the operation of the above-described operation and maintenance server EM, subscriber management server HSS, trace collection server TCE, mobility management node MME, radio base station eNB, or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. Such an ASIC may be arranged in the operation and maintenance server EM, the subscriber management server HSS, the trace collection server TCE, the mobility management node MME, the radio base station eNB, or the mobile station UE. As a discrete component, such a storage medium and processor may be arranged in the operation and maintenance server EM, the subscriber management server HSS, the mobility management node MME, the trace collection server TCE, the radio base station eNB, or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST eNB . . . Radio base station
HSS . . . Subscriber management server MME ... Mobile management node
11, 21, 31 ... Reception unit
12, 32 ... Selection unit
13, 24, 34 ... Transmission unit
22, 33 ... Determination unit
23, 33A ... Management unit

The invention claimed is:

1. A mobile communication method, in which a target mobile station performs a measurement process designated by an operation and maintenance server and reports a result of the measurement process, comprising:
 a step of transmitting, by the operation and maintenance server, instruction information for instructing execution of the measurement process, the instruction information including designation of a target area, to a radio base station;
 a step of selecting, by the radio base station, the target mobile station in the target area on the basis of the instruction information;
 a step of inquiring, by the radio base station, of a predetermined node about whether the target mobile station is approved for performing the measurement process; and
 a step of instructing, by the radio base station, the target mobile station to perform the measurement process when the target mobile station is approved for performing the measurement process, wherein
 in the step of selecting, a predetermined number of mobile stations for performing the measurement process are selected from mobile stations in a connected state with the radio base station as the target mobile station.

2. A mobile communication method, in which a target mobile station performs a measurement process designated by an operation and maintenance server and reports a result of the measurement process, comprising:
 a step A of transmitting, by the operation and maintenance server, instruction information for instructing execution of the measurement process, the instruction information including designation of a target area, to a radio base station;
 a step B of selecting, by the radio base station, the target mobile station in the target area on the basis of the instruction information;
 a step C of determining, by the radio base station, whether the target mobile station is approved for performing the measurement process; and
 a step D of instructing, by the radio base station, the target mobile station to perform the measurement process when it is determined that the target mobile station is approved for performing the measurement process, wherein
 in the step B, a predetermined number of mobile stations for performing the measurement process are selected from mobile stations in a connected state with the radio base station as the target mobile station.

3. The mobile communication method according to claim 2, wherein in the step C, the radio base station determines whether the target mobile station is approved for performing the measurement process, on the basis of information received from a predetermined node.

4. A radio base station, which is used in a mobile communication system configured such that a target mobile station is able to perform a measurement process designated by an operation and maintenance server and to report a result of the measurement process, comprising:
 a selection unit that selects the target mobile station in a target area on the basis of instruction information for instructing execution of the measurement process, the instruction information including designation of a target area, when the instruction information is received from the operation and maintenance server;
 an inquiry unit that inquires a predetermined node of whether the target mobile station is approved for performing the measurement process; and
 an instruction unit that instructs the target mobile station to perform the measurement process when the target mobile station is approved for performing the measurement process, wherein
 the selection unit selects a predetermined number of mobile stations for performing the measurement process from mobile stations in a connected state with the radio base station as the target mobile station.

5. A radio base station, which is used in a mobile communication system configured such that a target mobile station is able to perform a measurement process designated by an operation and maintenance server and to report a result of the measurement process, comprising:
 a selection unit that selects the target mobile station in a target area on the basis of instruction information for instructing execution of the measurement process, the instruction information including designation of a target area, when the instruction information is received from the operation and maintenance server;
 a determination unit that determines whether the target mobile station is approved for performing the measurement process; and
 an instruction unit that instructs the target mobile station to perform the measurement process when it is determined that the target mobile station is approved for performing the measurement process, wherein
 the selection unit selects a predetermined number of mobile stations for performing the measurement process from mobile stations in a connected state with the radio base station as the target mobile station.

6. The radio base station according to claim 5, wherein the determination unit is configured to determine whether the target mobile station is approved for performing the measurement process, on the basis of information received from a predetermined node.

* * * * *